(12) United States Patent
Pochiraju et al.

(10) Patent No.: US 10,262,256 B2
(45) Date of Patent: Apr. 16, 2019

(54) ANTENNA FOR IDENTIFICATION TAG AND IDENTIFICATION TAG WITH ANTENNA

(71) Applicant: Datamars S.A., Lugano (CH)

(72) Inventors: Tej Pochiraju, Leicestershire (GB); Brian Eadie, Philiphaugh (GB)

(73) Assignee: Datamars S.A., Lugano (CH)

( * ) Notice: Subject to any disclaimer, the term of this patent is extended or adjusted under 35 U.S.C. 154(b) by 0 days.

(21) Appl. No.: 15/538,523

(22) PCT Filed: Jan. 12, 2016

(86) PCT No.: PCT/GB2016/050066
§ 371 (c)(1),
(2) Date: Jun. 21, 2017

(87) PCT Pub. No.: WO2016/113554
PCT Pub. Date: Jul. 21, 2016

(65) Prior Publication Data
US 2017/0344873 A1    Nov. 30, 2017

(30) Foreign Application Priority Data

Jan. 13, 2015    (GB) .................................. 1500509.3

(51) Int. Cl.
| | |
|---|---|
| *H01Q 1/22* | (2006.01) |
| *H01Q 1/27* | (2006.01) |
| *G06K 19/077* | (2006.01) |
| *A01K 11/00* | (2006.01) |
| *G06K 19/07* | (2006.01) |

(Continued)

(52) U.S. Cl.
CPC ...... *G06K 19/07792* (2013.01); *A01K 11/004* (2013.01); *A01K 11/006* (2013.01); *G06K 19/0726* (2013.01); *G06K 19/0772* (2013.01); *G06K 19/07749* (2013.01); *G06K 19/07758* (2013.01); *H01Q 1/2208* (2013.01); *H01Q 1/2225* (2013.01); *H01Q 1/273* (2013.01); *H01Q 1/36* (2013.01); *H01Q 1/405* (2013.01);

(Continued)

(58) Field of Classification Search
CPC ................................................. G06K 19/07792
USPC ................ 235/439, 451, 492; 343/702, 785; 340/593.11
See application file for complete search history.

(56) References Cited

U.S. PATENT DOCUMENTS

| | | |
|---|---|---|
| 2002/0030630 A1 | 3/2002 | Maeda et al. |
| 2003/0062907 A1* | 4/2003 | Nevermann ............. G01D 5/48 324/637 |

(Continued)

FOREIGN PATENT DOCUMENTS

WO    WO 92/02127    2/1992

OTHER PUBLICATIONS

International Search Report and Written Opinion of PCT/GP2016/050066, dated May 26, 2016.

*Primary Examiner* — Allyson N Trail
(74) *Attorney, Agent, or Firm* — Foley & Lardner LLP

(57) ABSTRACT

Disclosed is an ultra high frequency antenna device for use with an identification tag for attachment to an animal. The antenna device comprises: a meander line antenna; and a substrate. The antenna device is operable to use the body of the animal to which it is attached as part of the tuning circuit of said antenna device. Also disclosed is an ultra-high frequency identification tag comprising such an antenna device, and a method of manufacturing such an ultra-high frequency identification tag.

18 Claims, 4 Drawing Sheets

(51) Int. Cl.
  *H01Q 9/26*   (2006.01)
  *H01Q 1/36*   (2006.01)
  *H01Q 1/40*   (2006.01)
  *H01Q 23/00*  (2006.01)
  *H01Q 1/48*   (2006.01)

(52) U.S. Cl.
  CPC ............ *H01Q 1/48* (2013.01); *H01Q 9/26* (2013.01); *H01Q 23/00* (2013.01)

(56) References Cited

U.S. PATENT DOCUMENTS

| | | | |
|---|---|---|---|
| 2003/0164762 A1* | 9/2003 | Ridley | G08B 31/00 340/521 |
| 2005/0024287 A1 | 2/2005 | Jo et al. | |
| 2007/0139202 A1* | 6/2007 | Austin | B29C 45/14639 340/572.8 |
| 2008/0231421 A1* | 9/2008 | Tuttle | G06K 19/07749 340/10.1 |
| 2009/0094869 A1 | 4/2009 | Geissler et al. | |
| 2009/0179810 A1* | 7/2009 | Kato | G06K 7/10178 343/785 |
| 2011/0057042 A1* | 3/2011 | Duggan | G06K 19/07749 235/492 |
| 2011/0163921 A1* | 7/2011 | Chirila | H01Q 1/2208 343/702 |
| 2011/0316693 A1 | 12/2011 | Loen et al. | |
| 2013/0078910 A1* | 3/2013 | Akiyama | G06K 19/07749 455/11.1 |
| 2014/0180365 A1* | 6/2014 | Perryman | H01Q 1/40 607/60 |
| 2015/0161874 A1* | 6/2015 | Thyroff | G08B 21/245 340/539.11 |
| 2016/0110639 A1* | 4/2016 | Finn | G06K 19/07788 235/439 |
| 2017/0147918 A1* | 5/2017 | Karani | G06K 19/07762 |

\* cited by examiner

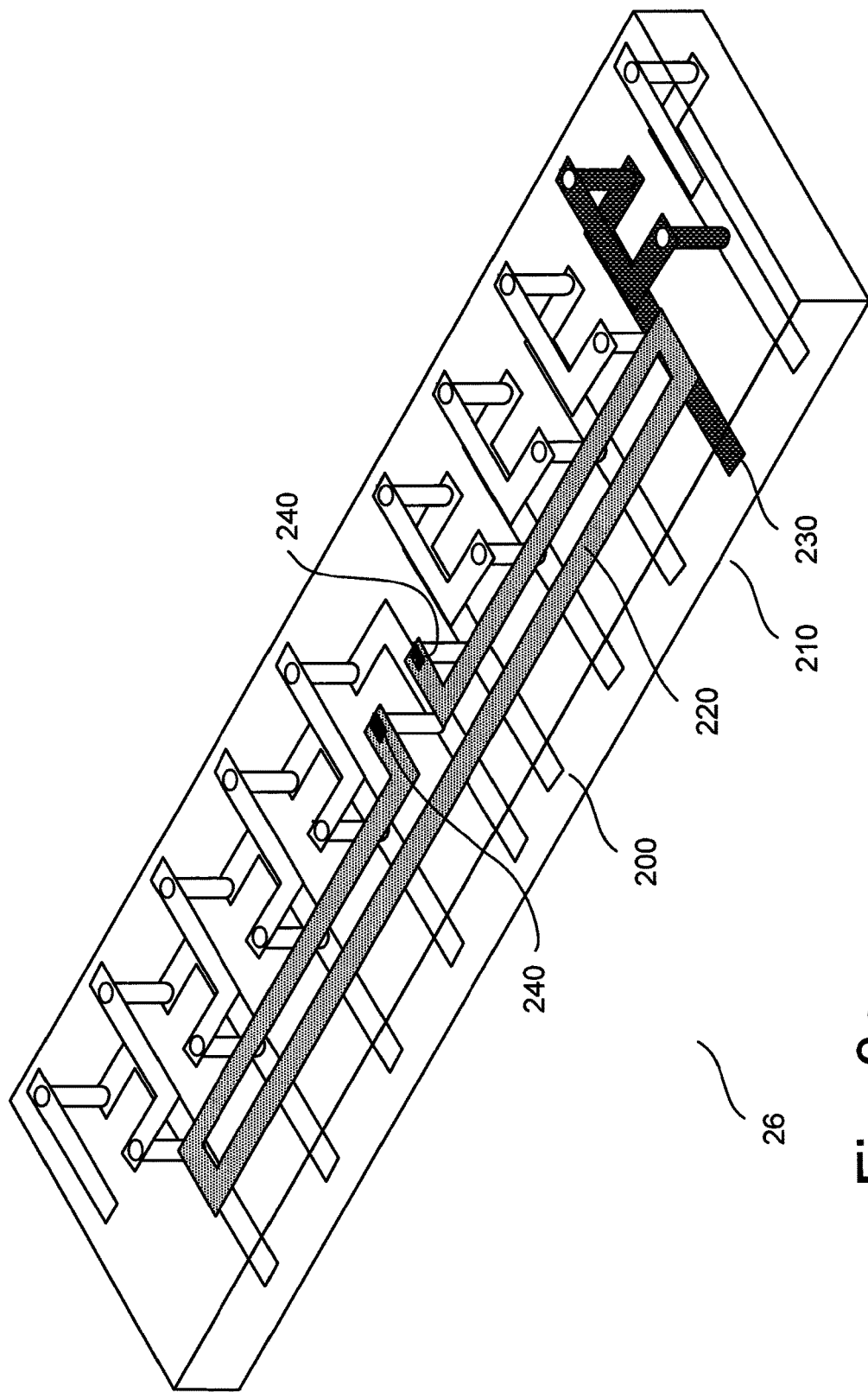

ANTENNA FOR IDENTIFICATION TAG AND IDENTIFICATION TAG WITH ANTENNA

This application is a US National Stage of International Application PCT/GB2016/050066 filed Jul. 12, 2016, which in turn claims priority to GB Application No. 1500509.3 filed Jan. 13, 2015, both of which are incorporated herein by reference in their entities.

The present invention is directed to the field of identification tags, and provides an improved antenna for such identification tags.

Existing identification tags—especially those applied to livestock—are typically formed from moulded plastics. These tags may, according to one example, have first and second portions foldable relative to one another to close the tag. In another example they may be formed by two part mouldings. The first male portion has a piercing pin which, when the tag is closed, passes through an appendage of the animal, e.g. an ear, and into a corresponding aperture on the second female portion. The piercing pin locks within the aperture and the tag is thus secured.

Electronic identification (radio frequency identification or RFID) tags for livestock have typically used low frequency communication. Low frequency communication has the advantage of the signal largely passing through, rather than being absorbed, the animal flesh. However, low frequency communication has a shorter range and slower communication speed compared to high frequency RFID tags, such as tags which operate in the ultra-high frequency (UHF) band. This means that monitoring of animals using low frequency tags can result in misreads and miscounts. However, providing a suitable antenna for a UHF identification tag to be used for livestock presents significant challenges while maintaining suitably small dimensions for use in an identification tag for livestock tracking.

It would be desirable to provide a UHF antenna which is suitable for use with an identification tag for attachment to livestock or other animals.

SUMMARY OF INVENTION

In a first aspect of the invention there is provided an ultra high frequency antenna device for use with an identification tag, said identification tag for attachment to an animal, said antenna device comprising:
a meander line antenna; and
a substrate;
wherein said antenna device is operable to use the body of the animal to which it is attached as part of the tuning circuit of said antenna device.

In a specific example, the antenna device does not comprise a ground plane, said antenna device being operable to use the body of an animal as a ground plane.

The antenna device may be purposely detuned such that it is only tuned to a desired frequency when in the proximity of an animal. The antenna device may be purposely detuned such that it is only tuned to a desired frequency when comprised within a tag and the tag attached to an animal.

Said meander line antenna may be a three-dimensional meander line antenna. Said meander line antenna may comprise two layers.

Said antenna device may comprise connector pads on its surface for the direct connection of an integrated circuit. The antenna device may comprise an integrated circuit mounted to said connector pads.

One or more of the dimensions of the meander line antenna, spacing between elements and layers of the meander line antenna, the number of turns the meander line antenna and the substrate thickness may be tuned to impedance match the antenna device to an integrated circuit to which it is to be attached, and such that no further external impedance matching components are required.

Said antenna device may have a thickness smaller than 2 mm. Said antenna device may be no larger than 70 mm in any dimension, no larger than 50 mm in any dimension, or no larger than 25 mm in any dimension. The antenna device may have one or more of the following dimensions in any combination: the total meander length may be between 80 mm to 300 mm, the substrate thickness may be between 1 mm to 3 mm, the line width may be between 0.3 mm to 0.7 mm, the loop length may be between 8 mm to 12 mm, the substrate width may be 4 mm to 10 mm and the substrate length may be between 20 mm to 60 mm. The antenna device may have all of these dimensions.

In a further aspect of the invention there is provided an ultra-high frequency identification tag for attachment to an animal, said identification tag comprising:
a body;
an integrated circuit; and electrically connected to said integrated circuit,
an antenna device of the first aspect of the invention.

Said body may comprise at least one recess for receiving said integrated circuit and antenna device. Said recess may be such that said integrated circuit is located between said body and said antenna device within said recess, such that the integrated circuit and its connection to the antenna device is protected by the antenna device during an overmoulding process of said identification tag. Said recess may comprise a first recess for receiving the antenna device, and within said first recess, a second recess for receiving said integrated circuit.

Said identification tag said body consists of a rigid material.

In an embodiment, said identification tag may comprise no ground plane.

In an embodiment, said identification tag may comprise no printed circuit board for the mounting of said integrated circuit.

In an embodiment, said identification tag may comprise no external impedance matching components.

In a further aspect of the invention there is provided a method of manufacturing an ultra-high frequency identification tag, said method comprising:
mounting an integrated circuit to connector pads on the surface of an antenna device;
introducing said antenna device into a recess within a body of an identification tag such that said integrated circuit is located within the recess between said body and said antenna device; and
overmoulding said body and antenna device.

Said ultra-high frequency identification tag may be as described in accordance with the second aspect of the invention.

Said antenna device may be as described in accordance with the first aspect of the invention.

BRIEF DESCRIPTION OF THE DRAWINGS

Embodiments of the invention will now be described, by way of example only, by reference to the accompanying drawings, in which:

FIG. 3a is an illustration of an antenna device according to an embodiment of the invention.

DETAILED DESCRIPTION OF THE EMBODIMENTS

Figure 1:
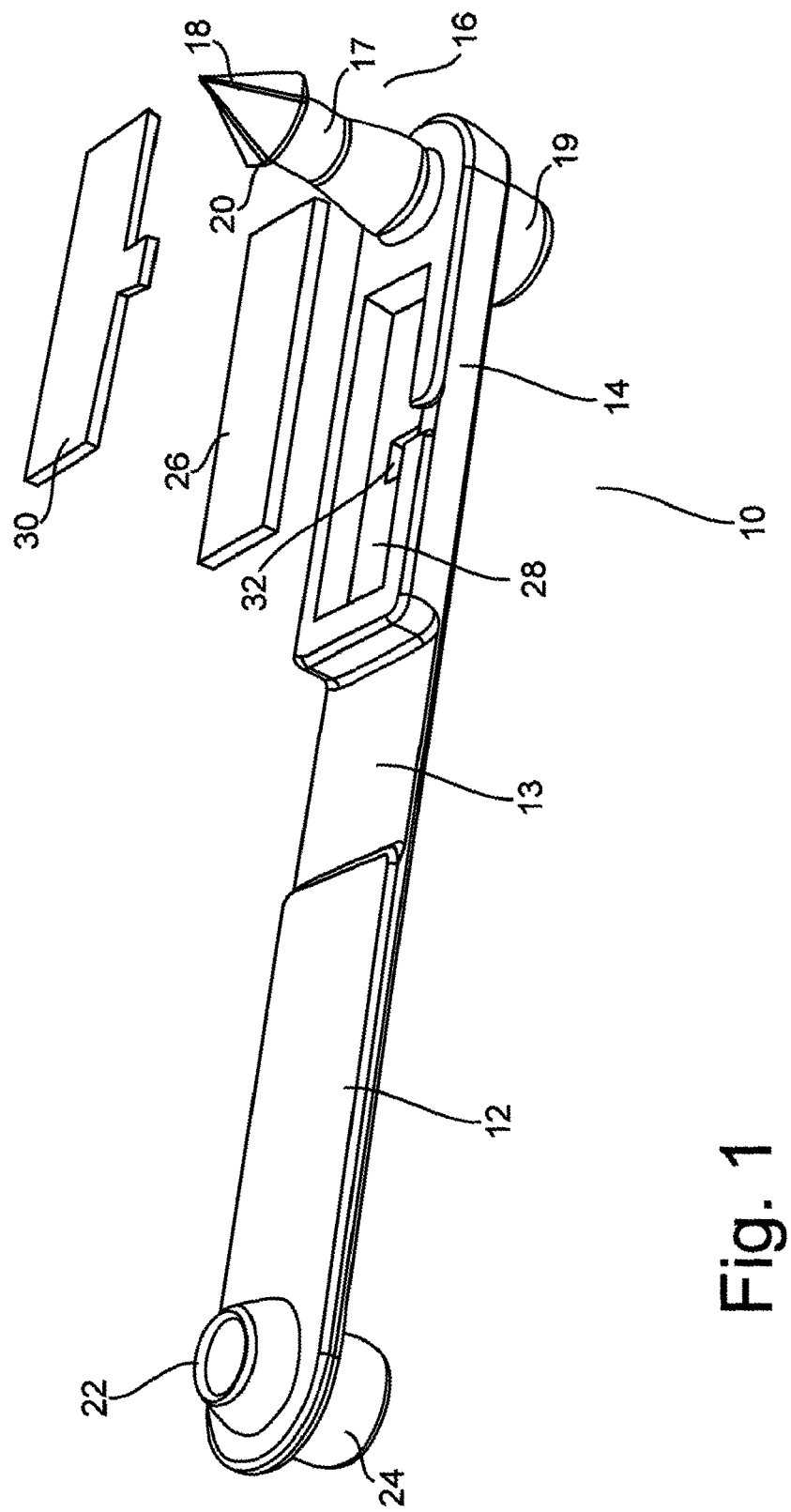
FIG. 1 is an exploded illustration of an identification tag according to a first embodiment of the invention.

FIG. 1 shows an embodiment of an identification tag, specifically a UHF identification tag, generally designated 10. The identification tag 10 may be an ear-tag or wing-tag for attaching to an ear or a wing of an animal (non-human). The tag 10 comprises first and second elongate body portions 12, 14 which are preferably integrally formed. Located at the end of the first body portion 12 remote from the second body portion 14 is a locking aperture 22. The underside of the first body portion 12 includes an annular lip, or guard, 24 which projects from the underside of the tag 10 and encompasses the locking aperture 22.

The second body portion 14 includes a projection 16 located at the end of the second body portion 14 remote from the first body portion 12. The projection 16 comprises an upper part 17 and a lower part 19. The upper and lower parts 17,19 are each provided with complimentary fastening means, such as snap-fitting male and female connectors (not shown), which allow the two parts 17,19 to be attached to one another. A locating aperture (not shown) is provided at the remote end of the second body portion 14, and the two parts 17,19 of the projection are connected to one another through the locating aperture so that the projection 16 is held in place. The upper part 17 has a pointed tip 18, at least a portion of which has a larger diameter than that of a portion of the upper part 17 which is immediately adjacent the tip 18. As a result, a ridge 20 is formed at the point where the tip 18 meets the remainder of the upper part 17. The locking aperture 22 in the first body portion 12 has a diameter which is less than the diameter of the widest portion of the tip 18 of the projection 16.

The tag 10 further comprises a flexible portion 13 which is located between the first and second body portions 12,14 and permits pivoting of the first and second body portions 12,14 relative to one another. The first and second body portions 12,14 and the flexible portion 13 can be integrally formed. The flexible portion 13 may have a reduced thickness compared with the first and second body portions 12,14. The tag may be designed to be applied to an animal using an applicator. When the tag is in the applicator jaws ready to be applied to an item, it is normal for the jaw holding the first body portion 12 to remain fixed while the jaw holding the second body portion 14 pivots relative to the other jaw in order to fold the body portions 12,14 together. The pointed tip 18 of the projection 16 will enter the aperture 22. As the folding motion continues the ridge 20 will pass through the aperture 22 and come out on the underside of the first body portion 12. As the ridge 20 is wider than the aperture 22, it cannot pass back through the aperture 22. The projection 16 and aperture 22 therefore lock the two body portions 12,14 together. Once through the aperture 22, the tip 18 of the projection does not project beyond the guard 24. Consequently, the guard 24 ensures that the tip 18 cannot catch on anything once the tag is applied.

Depending on the item to which the tag is being applied, the body portions 12,14 can either sandwich part of the animal between them, or else the tip 18 of the projection 16 can be forced through a portion of the item under the action of the applicator jaws immediately before the tip 18 enters the aperture 22. Whichever attachment method is used, the tag will be securely attached to the animal which is to be identified once the tip 18 passes through the aperture 22.

The tag 10 comprises an ultra-high frequency (UHF) antenna device 26. The antenna device 26 will be described in greater detail below. The antenna device 26 has a thin form to match form of one of the body portions 12,14 in which it is mounted (here the second body portion 14). To mount the antenna device 26, a first recess 28 is provided in the body portion 14. A cover 30 is provided for covering the antenna device 26 within the first recess 28.

First recess 28 may be provided with a second recess 32 within it. The second recess 32 houses an integrated circuit (not shown) to which the antenna device 26 will be electrically connected.

Figure 2:
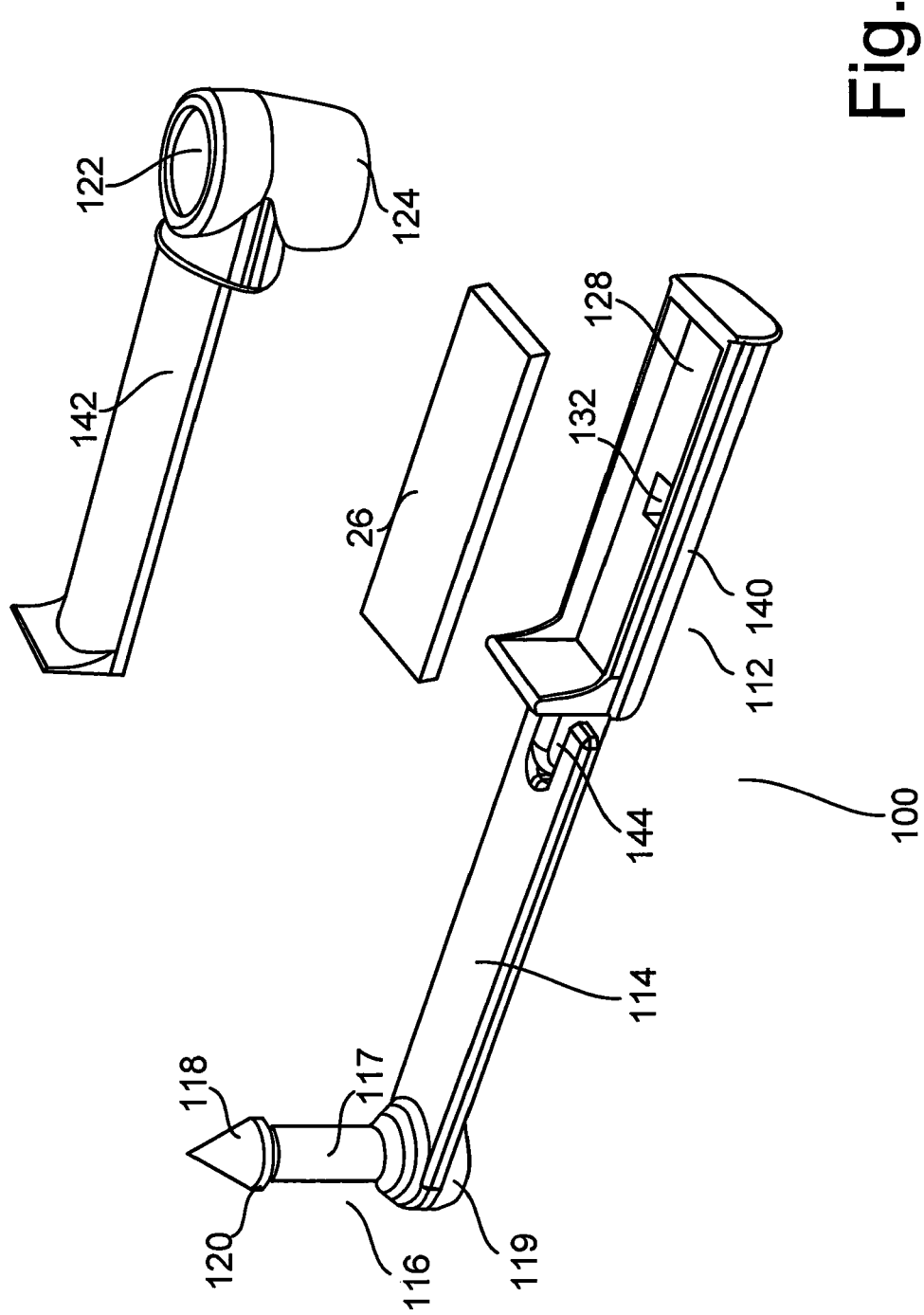
FIG. 2 is an exploded illustration of an identification tag according to a second embodiment of the invention.

FIG. 2 shows an alternative embodiment of an identification tag, generally designated 100. The tag 100 comprises first and second elongate body portions 112, 114. Here, first body portion 112 is formed in first and second parts 140, 142. The first part 140 comprises a first recess 128 for the antenna device 26, and a second recess 132 for an integrated circuit. The second part 142 covers the antenna device 26.

The second part 142 of the first elongate body portion 112 also comprises the locking aperture 122 with guard 124. The second elongate body portion 114 comprises the projection 116 with upper and lower parts 117, 119, pointed tip 118 and ridge 120. These are essentially similar to their counterparts forming part of identification tag 10 as illustrated in FIG. 1.

In this embodiment, the first and second elongate body portions 112, 114 are formed separately and are hinged to allow their relative rotation at hinge 144.

With either of the tags 10, 100 described above, how the integrated circuit is connected to the antenna 26 is a matter of choice, and may include adhesive or solder. The design of the tags 10, 100 means that how the connection is made is unimportant. With the integrated circuit connected to one side of the antenna device 26, the integrated circuit and antenna device 26 are located within the recesses such that the integrated circuit locates inside the second recess 32, 132 and the antenna device 26 locates within the first recess 28, 128. In this way the integrated circuit and its connection to the antenna device 26 is protected during over-moulding of the device. The assembly is placed into a bath of molten plastic with the integrated circuit within the second recess and protected from the molten plastic by the antenna device 26, such that only one side of the printed antenna (i.e. the side opposite that to which the integrated circuit is mounted) is exposed to the molten plastic.

The result of this production method is that the tag is rigid compared to the other, more flexible tags presently available. The vulnerable areas are 1) protected by being inside a chamber, 2) facing away from the molten plastic and 3) totally encompassed within plastic to form a robust inflexible assembly. Typical UHF animal tags comprise embedded UHF labels moulded into soft flexible ear tags that are normally made of polyurethane. By comparison, the tag described herein uses stiff, inflexible material which means that tag acts to protect the whole unit, and in particular the fragile connection between the integrated circuit and the antenna (see FIG. 3).

FIG. 3a is an illustration of the UHF antenna device 26. It comprises a two layer meander line antenna 200, formed on a substrate 210, such as a low temperature co-fired ceramic (LTCC) substrate. The substrate 210 should have a high dielectric constant. This aids with shrinking the antenna 200 to a size suitable for a tag that can be used on small animals. Substrate 210 may, for example, comprise glass reinforced nylon embedded with PTFE and ceramic. Such a material has a very low loss rate and high Dk value (e.g., Dk greater than 5, Dk greater than 7 or a Dk=7.5).

The 3D nature of the antenna 200 achieves better performance within the same geometry compared to single layered structures. The meander layer antenna comprises an antenna loop (light shaded for clarity) 220 and a number of antenna elements 230 (a single antenna element being dark shaded for clarity). In this example there are ten such antenna elements 230. Antenna loop 220 has a connector pad (IC pad) 240 at each of its ends for mounting of an integrated circuit. The connector pads 240 are therefore on the surface of the antenna device 26

Figure 3B:
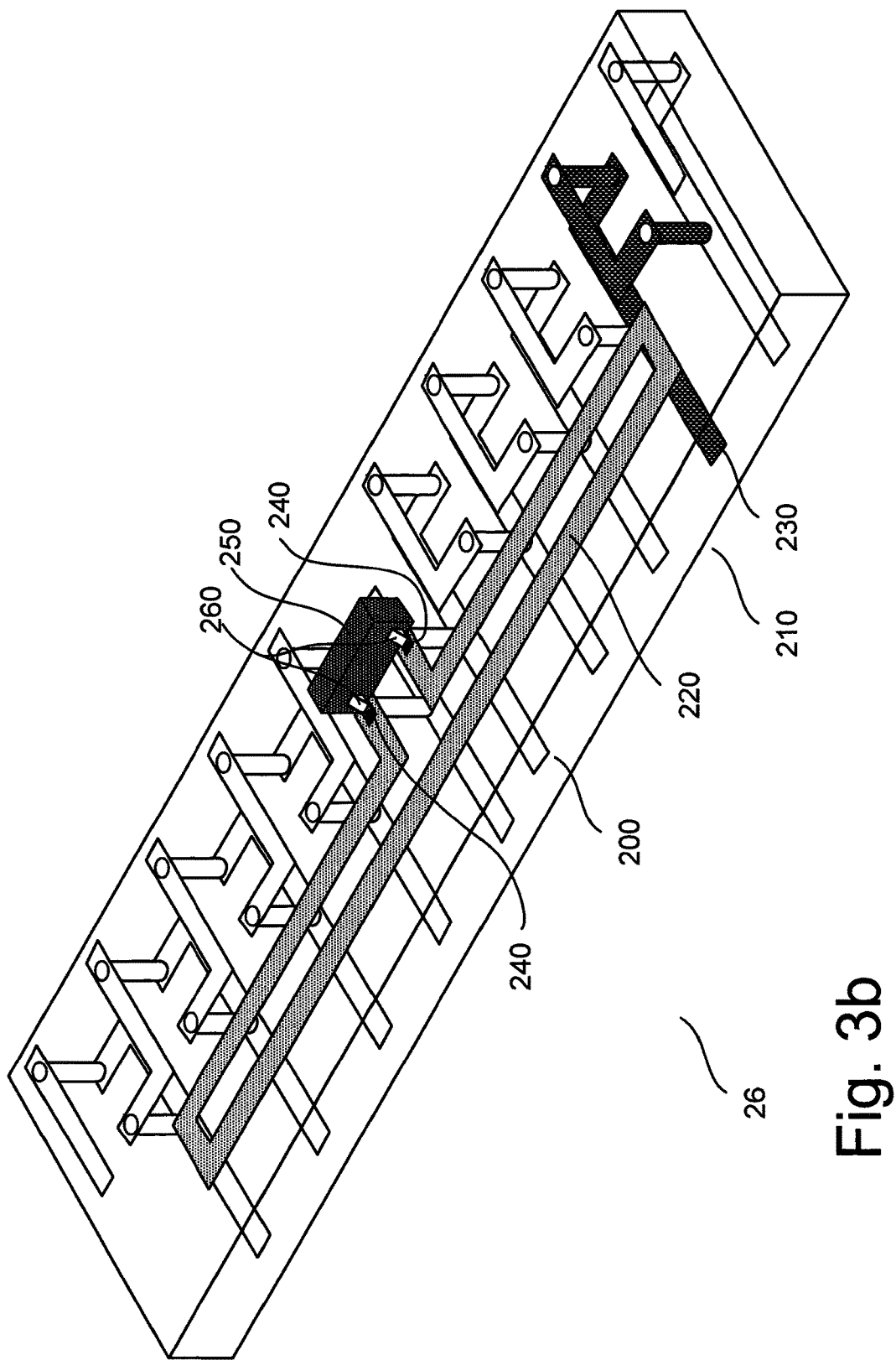
FIG. 3b shows the antenna device of FIG. 3a with integrated circuit mounted thereon.

FIG. 3b shows the antenna device 26 of FIG. 3a, with an integrated circuit 250 mounted to connector pads 240 via connections 260.

Known UHF antennas for use in RFID applications rely on external matching and feed networks in addition to a large (non-overlapping) metallic ground plane. The antenna device 26 design disclosed herein does not require these elements.

In a conventional antenna a metallic ground plane is provided to act as a capacitive plate contributing to the impedance of the antenna, and to reflect some of the radiated electromagnetic waves (i.e., the signal being transmitted or received) thereby contributing to a higher gain. The antenna device 26 disclosed herein, when comprised within a tag for attaching to an animal, instead uses the animal's body to which it is attached to tune the antenna 200 and reflect some of the electromagnetic waves. This is possible because the animal's body comprises fatty tissue which has a high dielectric permittivity and reflects most of the electromagnetic waves incident upon it.

Typically, a tuned antenna designed for operation at a particular frequency, for example 868 MHz, becomes detuned when attached to an animal body unless it is 'protected', for example using a ground plane as used in patch antennas. This is the common approach in body wearable antennas. As a result, the minimum dimension of a patch antenna is about 90 mm, which would be too large for the applications described herein. Another option is the use of artificial impedance surfaces using metallic features/magnetic materials. However, these still result in larger antennas and complex and expensive manufacturing techniques.

Consequently, deliberate detuning of the antenna 200 is proposed. The detuning of the antenna is such that the antenna is correctly tuned to the desired frequency only when in an operational configuration, for example mounted within an identification tag and attached to an animal body. This enables the antenna to work without a dedicated ground plane. The part of the animal to which the tag is designed to be attached (e.g. the ear) and the tag body itself are part of the tuning circuit and are used to tune the antenna to the desired frequency to achieve on-body (on-ear), in-tag resonant behaviour. Where there is also a separate low frequency antenna provided in the tag, the tuning of the antenna should take into account the effect of this antenna also. The degree of deliberate detuning may be dependent upon the animal, and/or the part of the animal, to which the tag is being attached. The amount of fat in the animal tissue may vary from animal to animal (for example between a sheep's ear and a hen's wing) and the antenna circuit should be tuned accordingly.

As is well known, impedance matching is required for antennas to ensure maximum power transfer from the integrated circuit to which it is connected. A tuned antenna is a resonant circuit with an inductor and a capacitor, and an ideally tuned antenna shows only a resistive load at the resonant frequency. Conventional chip antennas are typically connected to integrated circuits designed for 50 ohm operation, and therefore the antenna needs to be matched to 50 ohm. Since chip antennas are essentially inductors, they require relatively large capacitances for matching depending on the frequency. These large capacitances are only achievable using SMD (surface mount device) capacitors thereby necessitating external matching components.

The inputs of UHF RFID integrated circuits have a small capacitance in parallel with a large resistance. The effective input impedance is then a low resistance and a large reactance. The antenna in this case should have a large inductive reactance to match to this load. The miniature nature of the present design of antenna device 26 and the resultant proximity of metallic features introduces a capacitance, effectively reducing the inductance of the antenna. In particular, there are two capacitive effects: there is a capacitance introduced by the two layers of the meander line antenna separated by the ceramic substrate; and there is a capacitive field between individual sections of the meander line. Therefore, to compensate and achieve a good match without external components the length, spacing, number of turns and substrate thickness of the antenna device 26 have been specifically tuned.

Increasing the overall antenna length increases inductance and reduces resonant frequency. Reducing spacing increases capacitances and increases resonant frequency. Increasing the number of turns while maintaining spacing increases overall length and hence increases inductance/reduces resonant frequency. However, increasing the number of turns while maintaining overall dimensions reduces spacing and hence increases capacitance/increases resonant frequency. If the overall meander length is also changing, the effects are complex combination of change in inductance and capacitance. Reducing substrate thickness has the same effect as reducing spacing and therefore increases capacitances and increases resonant frequency.

In an embodiment, the antenna device may have one, more or all of the following dimensions in any permutation: the total meander length may be between 80 mm to 300 mm, the substrate thickness may be between 1 mm to 3 mm, the line width may be between 0.3 mm to 0.7 mm, the loop length may be between 8 mm to 12 mm, the substrate width may be 4 mm to 10 mm and the substrate length may be between 20 mm to 60 mm.

In addition, breaking the meander section of antenna 200 into two layers helps reduce the capacitance and overall length of the antenna.

A further feature of the antenna device 26 is that it comprises connector pads on its surface. Because of this, and the absence of external matching components as already described, there is no need for a separate printed circuit board for mounting the integrated circuit, as is required for standard 'chip' antennas. These connector pads are present on the top surface of the antenna. The integrated circuit is soldered/pasted to the pads depending on the package used.

The antenna device 26 may have dimensions in the range of 20-60 mm long, 3-20 mm wide and 0.5 to 3 mm thick. In a specific embodiment, it may have dimensions of 24 mm×6 mm×1 mm for use with sheep. Tags designed for cattle may be approximately twice as large. The antenna device 26 achieves return loss better than −15 dB and realised gain of −14 dBi, suggesting a maximum range of 2.1 m.

It should be appreciated that the above description is for illustration only and other embodiments and variations may be envisaged without departing from the spirit and scope of the invention.

The invention claimed is:

1. An ultra-high frequency identification tag for attachment to a livestock animal, said identification tag comprising:
   a body;
   an integrated circuit; and
   an ultra-high frequency antenna device electrically connected to said integrated circuit, wherein the antenna device comprises:
      a meander line antenna; and
      a substrate;
      said antenna device being operable to use a body of the animal to which it is attached as part of a tuning circuit of said antenna device such that said antenna device is operable to use the body of the animal as a ground plane; and wherein said antenna device is purposely detuned such that it is only tuned to a desired frequency when the tag is attached to the animal.

2. The identification tag as claimed in claim 1 wherein said meander line antenna is a three-dimensional meander line antenna comprising two layers.

3. The identification tag as claimed in claim 1 wherein the integrated circuit is directly connected to the antenna via connector pads on a surface of said antenna.

4. The identification tag as claimed in claim 1 wherein one or more of:
   the dimensions of the meander line antenna,
   spacing between elements and layers of the meander line antenna,
   the number of turns the meander line antenna; and
   the substrate thickness,
   may be tuned to impedance match the antenna device to the integrated circuit to which it is to be attached, and such that no further external impedance matching components are required.

5. The identification tag as claimed in claim 1 wherein the antenna device comprises a thickness smaller than 3 mm.

6. The identification tag as claimed in claim 1, wherein said antenna device is no larger than 50 mm in any dimension.

7. The identification tag as claimed in claim 1, wherein the antenna device comprises all of the following dimensions:
   a total meander length between 80 mm to 300 mm,
   a substrate thickness between 1 mm to 3 mm,
   a line width between 0.3 mm to 0.7 mm,
   a loop length between 8 mm to 12 mm,
   a substrate width between 4 mm to 10 mm and
   a substrate length between 20 mm to 60 mm.

8. The identification tag as claimed in claim 1 wherein said substrate is comprised of a material having a dielectric constant Dk greater than 5.

9. The identification tag as claimed in claim 1 wherein said body of the identification tag comprises at least one recess for receiving said integrated circuit and antenna device.

10. The identification tag as claimed in claim 9 wherein said integrated circuit is located within said recess, and between said body of the identification tag and said antenna device, such that the integrated circuit and its connection to the antenna device are protected by the antenna device during an over-moulding process of said identification tag.

11. The identification tag as claimed in claim 9 wherein said recess comprises a first recess for receiving the antenna device, and within said first recess, a second recess for receiving said integrated circuit.

12. The identification tag as claimed in claim 1 wherein said body of the identification tag consists of a rigid material.

13. The identification tag as claimed in claim 1 comprising no ground plane.

14. The identification tag as claimed in claim 1 comprising no printed circuit board for mounting of said integrated circuit.

15. The identification tag as claimed in claim 1 comprising no external impedance matching components.

16. A method of manufacturing the ultra-high frequency identification tag as claimed in claim 1, the method comprising:
   mounting the integrated circuit to connector pads on the surface of the antenna device;
   introducing the antenna device into a recess within the body of the identification tag such that the integrated circuit is located within the recess between the body and the antenna device; and
   overmoulding the body of the identification tag and the antenna device.

17. The identification tag as claimed in claim 1, wherein the body of the identification tag comprises:
   a first body portion having one of a locking aperture and a projection located at an end thereof,
   a second body portion having the other of the locking aperture and the projection located at an end thereof,
   wherein said first and second body portions being connected to allow relative movement such that the locking aperture and the projection can be brought and locked together for attaching the tag to the animal.

18. The identification tag as claimed in claim 17 wherein said antenna is mounted within the body of the identification tag, between the locking aperture and the projection.

* * * * *